United States Patent
Lewis

(10) Patent No.: US 7,359,977 B2
(45) Date of Patent: Apr. 15, 2008

(54) UBIQUITOUS VISITED LINKS

(75) Inventor: Scott M. Lewis, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 639 days.

(21) Appl. No.: 10/427,416

(22) Filed: May 1, 2003

(65) Prior Publication Data

US 2004/0083294 A1    Apr. 29, 2004

(30) Foreign Application Priority Data

Sep. 11, 2002    (CA)    .................................... 2402809

(51) Int. Cl.
*G06F 3/048*    (2006.01)

(52) U.S. Cl. ...................... 709/229; 715/805

(58) Field of Classification Search ................. 709/203, 709/229; 715/853, 805
See application file for complete search history.

(56) References Cited

U.S. PATENT DOCUMENTS

| | | | |
|---|---|---|---|
| 5,761,683 A * | 6/1998 | Logan et al. ................ 715/513 |
| 5,870,559 A * | 2/1999 | Leshem et al. .............. 709/223 |
| 5,983,244 A | 11/1999 | Nation | |
| 6,037,935 A * | 3/2000 | Bates et al. .................. 715/760 |
| 6,289,362 B1 | 9/2001 | Van Der Meer | |
| 6,310,630 B1 * | 10/2001 | Kulkarni et al. ............ 715/776 |
| 6,310,889 B1 | 10/2001 | Parsons et al. | |
| 6,535,916 B1 * | 3/2003 | Nguyen ...................... 709/224 |
| 6,738,768 B1 * | 5/2004 | Johnson ......................... 707/7 |
| 6,742,030 B1 * | 5/2004 | MacPhail .................... 709/224 |
| 7,007,237 B1 * | 2/2006 | Sharpe ........................ 715/764 |

\* cited by examiner

*Primary Examiner*—Kenneth R. Coulter
(74) *Attorney, Agent, or Firm*—Duke W. Yee; A. Bruce Clay; Peter B. Manzo

(57) ABSTRACT

Where a user logs on to a web page server, the server can maintain a history of links to web pages hosted by the server to indicate which links are visited by the user. In consequence, a user may log on to the web page server from any web page-enabled device and the server will be able to differentiate for the user links the user has visited from links that have yet to be visited.

6 Claims, 5 Drawing Sheets

52 → `<meta http-eqiv="expires" content="Fri, 5 Apr 1996 23:40:40 GMT">`

54 → `<a href='http://www.ibm.com/rio'> ibm </a>` with 56 bracketing `http://www.ibm.com/rio`

FIG. 4

52 → `<meta http-eqiv="expires" content="Fri, 5 Apr 1996 23:40:40 GMT">`

154 → `<a style='color:#ff0000' href='http://www.ibm.com/rio'> ibm </a>` with 158 bracketing `color:#ff0000` and 56 bracketing `http://www.ibm.com/rio`

FIG. 5

UBIQUITOUS VISITED LINKS

BACKGROUND OF THE INVENTION

This invention relates to web page server operation.

A user typically views web pages through a browser program, such as NETSCAPE™, running on a client computer. A web page is typically coded in hypertext mark-up language (html) and the browser interprets this language to display the page. In this regard, as will be appreciated by those skilled in the art, the term "web page" is used to denote the software code for representing a web page as well as the displayed web page itself. Html allows the embedding of links to other web pages such that a user may request another web page by simply "clicking" on the display of the link in a web page; this is known as visiting a link. Where a web page has embedded links to other web pages, the browser program typically tracks links that a user using the same client computer has visited so as to display visited links in a different color from links yet to be visited.

Assuming that the client is a user's work computer, it may be that the user will later be using a home computer, a personal digital assistant (PDA), a laptop, or some other web page-enabled device. If so, and if the user loads the same web page as earlier loaded on his work computer, links visited while using the work computer will not show up as visited links on the other web page-enabled device. This can reduce the efficiency of the user who may not be able to remember what links he has visited and, consequently, may redundantly visit a link.

This invention seeks to address this problem.

SUMMARY OF INVENTION

Where a user logs on to a web page server, the server can maintain a history of links to web pages hosted by the server to indicate which links are visited by the user. In consequence, a user may log on to the web page server from any web page-enabled device and the server will be able to differentiate for the user links the user has visited from links that have yet to be visited.

In accordance with the present invention, there is provided a computer program product containing instructions which, when performed by a web page server requiring user log-on, causes said server to: when a user requests a given web page from said server, for each link in said given web page, compare a web page indicator of said link with web page indicators stored in a history file for said user and, on a match, modify said link prior to serving up said web page.

In accordance with another aspect of this invention, there is provided a method of operating a server, comprising: when a user requests a given web page from said server, for each link in said given web page, compare a web page indicator of said link with web page indicators stored in a history file for said user and, on a match, modify said link prior to serving up said web page.

In accordance with a further aspect of this invention, there is provided a web page server, comprising: memory storing a user record for each of a plurality of authorized users, each user record having a history file; a processor operable to, when an authorized user requests a given web page from said server, for each link in said given web page, compare a web page indicator of said link with web page indicators stored in said history file for said user and, on a match, modify said link prior to serving up said web page.

Other features and advantages of the invention will become apparent through a review of the following description in conjunction with the drawings.

BRIEF DESCRIPTION OF THE DRAWINGS

In the figures that disclose example embodiments of the invention.

DETAILED DESCRIPTION

Figure 1:
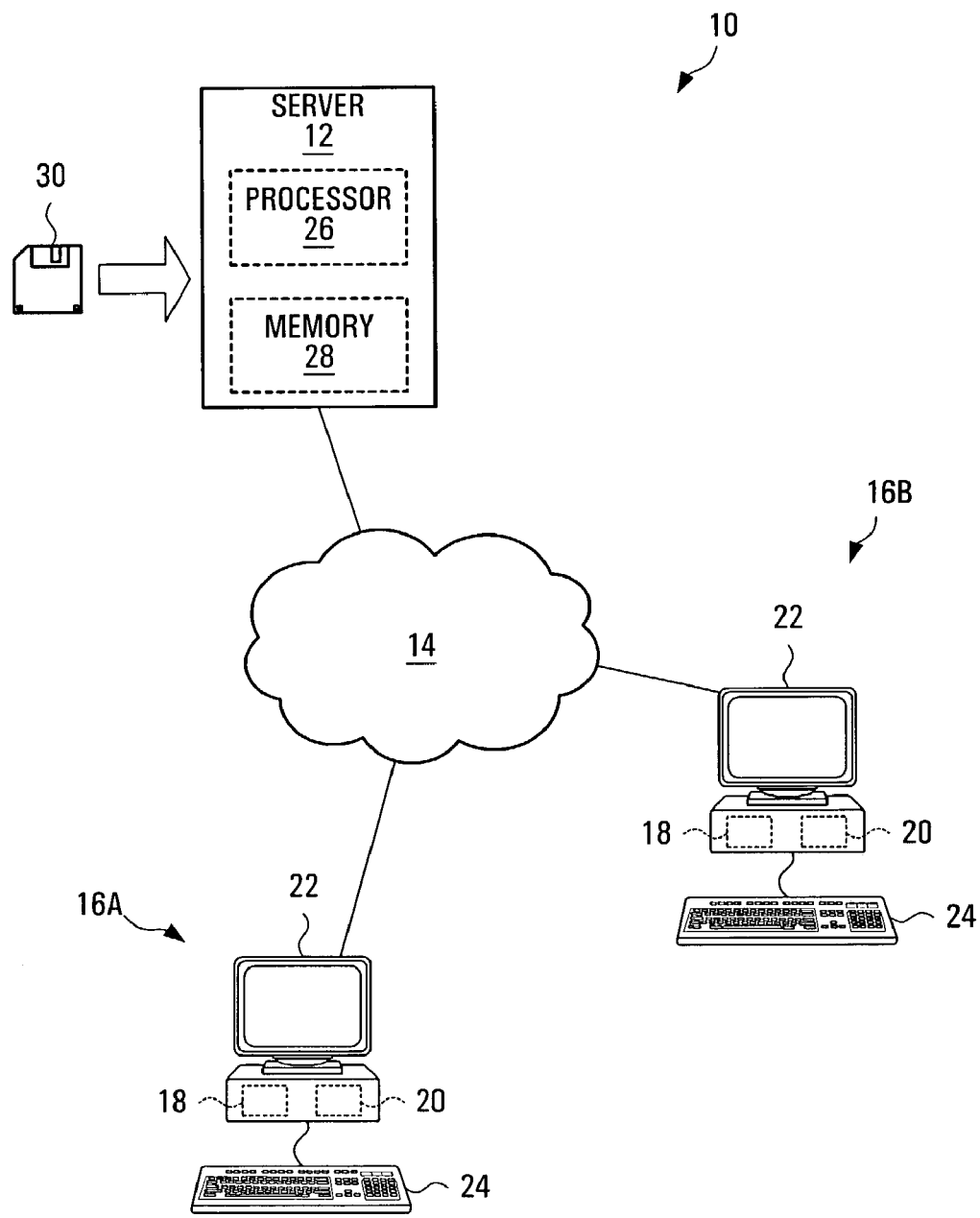
FIG. 1 is a schematic view of a system employing the subject invention.

Referring to FIG. 1, a system 10 that may employ the subject invention comprises a server 12 connected to a network 14 which may be the public internet. A number of clients 16a, 16b are also connected to the network. Each client may be any web-enable device. Client 16a is illustrated as a personal computer with a processor 18, memory 20, display 22, and user interface 24. The server 12 has a processor 26 and a memory 28. The memory 28 may be configured with software for undertaking the subject invention from computer program product 30 which may, for example, be a disk, memory chip, or file downloaded from a remote source.

Figure 2:
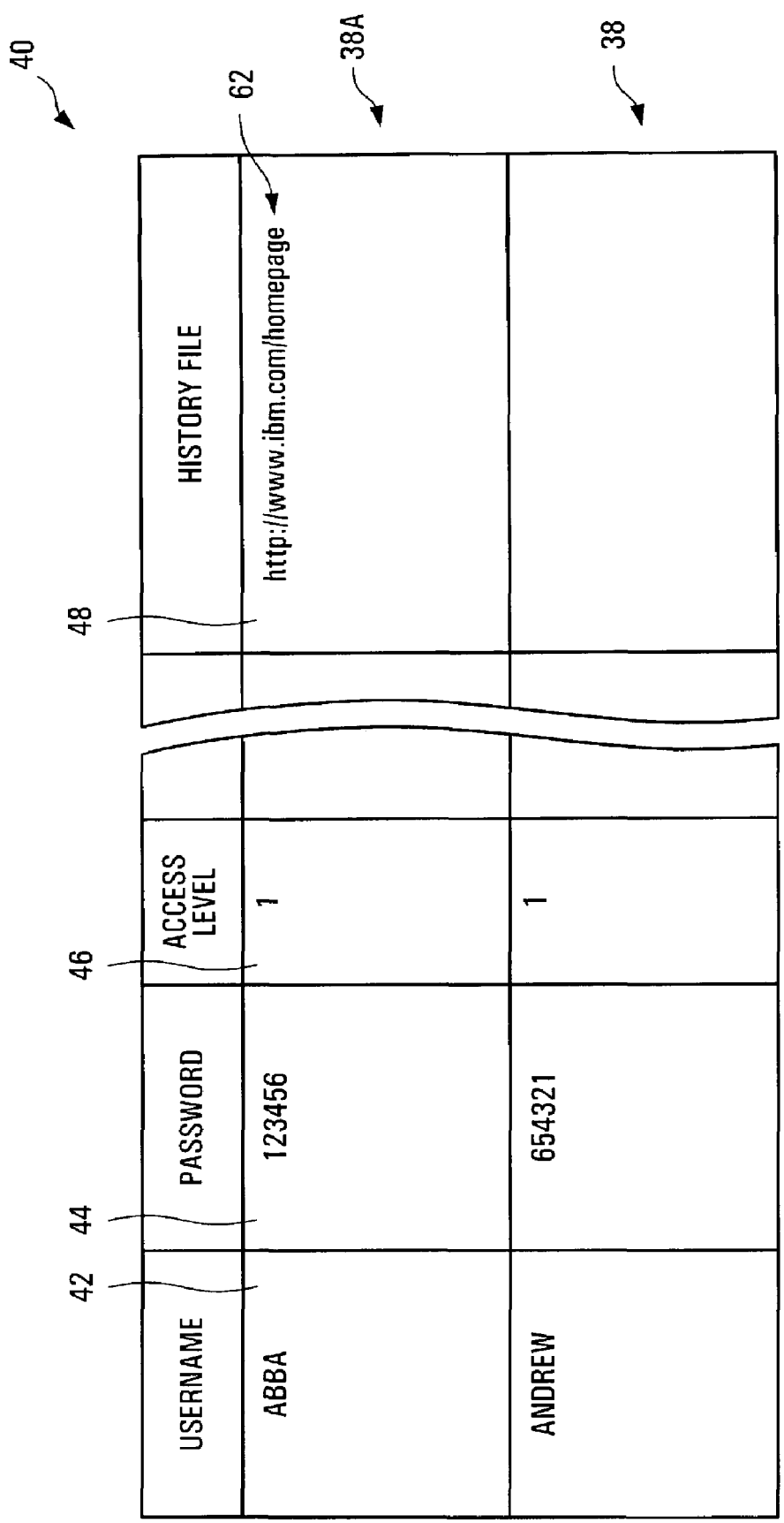
FIGS. 2 and 3 are views of a portion of the contents of a database of user records in the system of FIG. 1, FIGS. 4 and 5 illustrate portions of web pages in the system of FIG. 1, and FIGS. 6 and 7 are flow diagrams indicating operation of a portion of the system of FIG. 1.

In a manner well known to those skilled in the art, the server 12 is configured to accept commands only from authorized users. As such, memory 28 of the server maintains a database of records, one for each authorized user. FIG. 2 illustrates a portion of this database. Turning to FIG. 2, each user record 38 of database 40 comprises a username field 42, a password field 44, an access level field 46, and a history file field 48. A record may also include a number of other fields that have not been illustrated as they are not germane to the subject invention.

Also in a manner well understood by those skilled in the art, server 12 is configured to serve up web pages. Thus, the server stores web pages in memory 28. FIG. 4 illustrates a portion of a sample web page that may be stored in memory 28. Turning to FIG. 4, exemplary web page 50 is written in hypertext mark-up language (html) and contains a number of lines of code, including lines 52 and 54. Line 52 is the coding for a metatag that instructs the re-loading of the web page from the server each time it is requested. More precisely, the metatag indicates that the page expires as at a certain date such that the page needs to be re-loaded following that date. By setting the date for re-loading to a date in the past, line 52 ensures that the page will be re-loaded whenever it is requested. Line 54 is the coding for a hyperlink to another web page stored by server 12. As is typical, the hyperlink includes the universal resource locator (URL) 56 for the other web page.

Figure 6:
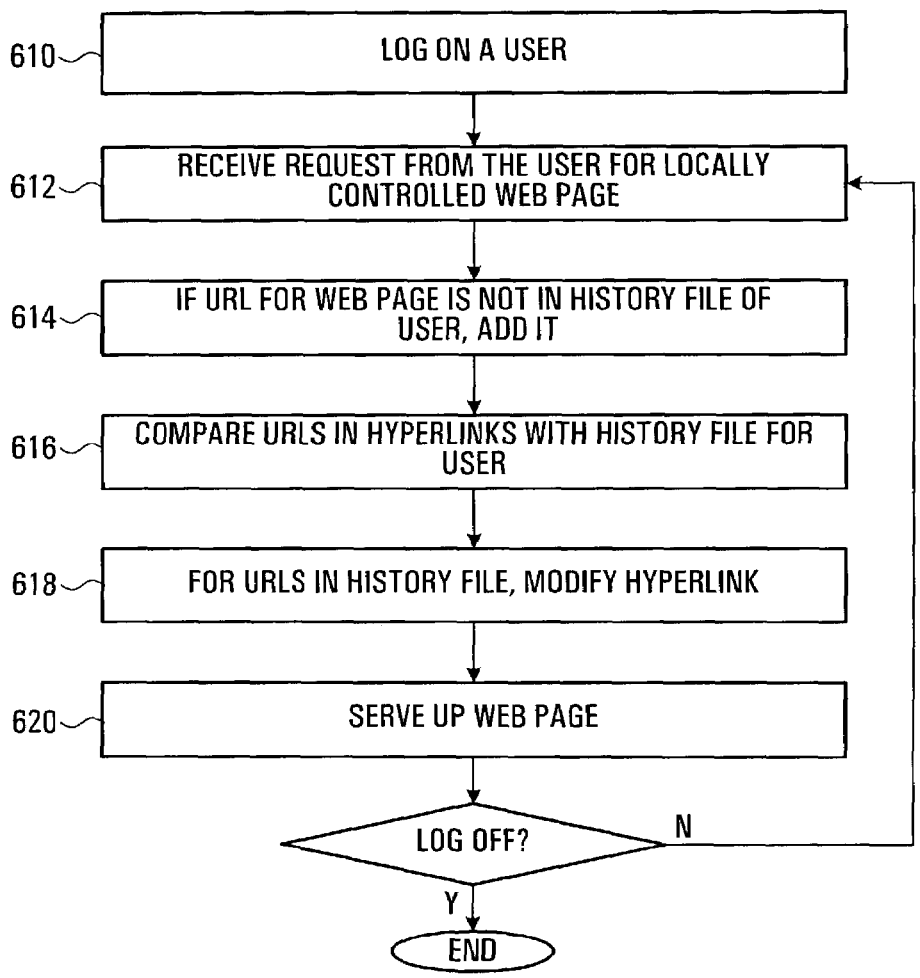

With reference to FIGS. 1 to 5 in conjunction with FIG. 6, which illustrates the operation of server 12, a user at client 16a may attempt to log on to the server by inputting a username and password (610). The username input by the user will be used by the server to look up a record in database 40 (FIG. 2). If a record is found and the password entered matches the password of the record, the log on will be successful. For example, if a user inputs the username "Abba" and the password "123456", the user would be logged on by virtue of record 38a. The user may instantiate a browser program at client 16a and request a web page hosted by the server by passing a URL to the server (612). The web page requested is typically the homepage of the user, such that the URL for the web page may be, for example, xxx.ibm.com/homepage (wherein xxx is www or its equivalent). The server obtains the web page at the URL from memory 28 (or from some other storage device that is part of the network served by the server). The server adds the URL of the page to the history file of the user, if that URL is not already in the history file (614). In the example of FIG. 2, the homepage URL 62 is already stored in the history file. Assuming the homepage is web page 50 (FIG. 4), the server will then compare the URL 56 of each hyperlink 54 in the homepage with hyperlinks stored in the history file field 48 (FIG. 2) of the record 38a (616). In this case, the only URL in the history file is that for the homepage and so no matches are returned. Consequently, the server simply serves up the web page to the client 16a (620).

Figure 3:
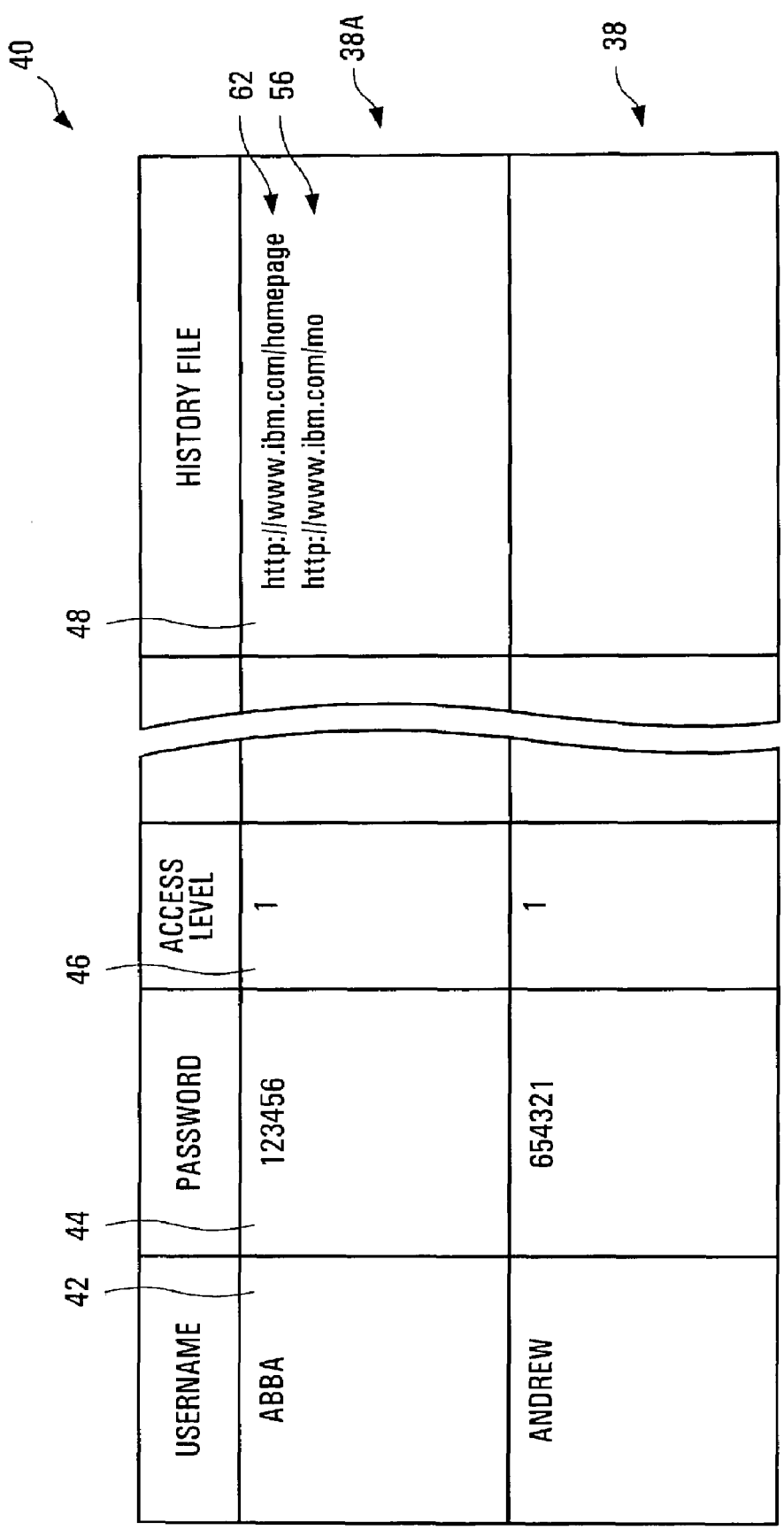

If, thereafter, the user tries to visit a hyperlink (typically by clicking on a visual display of the link in the web page created by the browser of the client), a URL for the link is passed by the browser to the server (612). For example, it is assumed that the user tries to visit the link created by code line 54 of web page 50. This results in the server receiving the URL xxx.ibm.com/rio(wherein xxx is www or its equivalent)and adding it to the history file of the user record (614). The resultant modified user record 38a' is shown in FIG. 3.

Now the server compares the URLs in the hyperlinks for the new web page with the history file (616); it is assumed no matches are found so that the server simply serves up the web page.

The user may next indicate to the browser of the client a desire to return to the homepage (as, for example, clicking on a "back" button of the browser). The homepage will typically be stored in cache at the client. When the browser begins to read the cached page, it will immediately encounter the metatag at line 52 of web page 50 which causes the browser to send a request to the server for the web page, rather than retrieving it from cache.

When the server receives the request for the homepage which, in the example, is web page 50 (612), it confirms its URL is already in the history file (614). The server then compares the URLs 56 in the hyperlinks 54 of web page 50 with the history file 48 of user record 38a' (FIG. 3) (616). In this instance, the server discovers that the URL 56 is in the history file (616). In consequence, the server modifies the hyperlink 54 (FIG. 4) to add code 158 (FIG. 5) specifying the color in which the hyperlink 154 should be displayed (618). In consequence, the web page sent by the server to the browser is modified web page 150 of FIG. 5, with modified hyperlink 154.

When the browser displays web page 150, it will display any hyperlinks without added coding specifying a color in a default color. However, it will display hyperlink 154 in the color coded for that hyperlink. In consequence, hyperlink 154 will be visually distinguished as a previously visited link.

It may be that the user will then log off (622). Subsequently, the same user may log on to the server at a different client, say client 16b. In such instance, it will be appreciated that when the homepage for the user is loaded on to the browser at the client, the URL 56 for the hyperlink 54 (FIG. 4) will be found in the history file for the user. In consequence, the hyperlink 54 will be modified (to hyperlink 154 of FIG. 5) before the homepage is served up so that it is visually distinguished as a visited link.

In view of the foregoing, a link, once visited by a user, is thereafter indicated as a visited link whenever the same user logs on to the server from any client.

Figure 7:
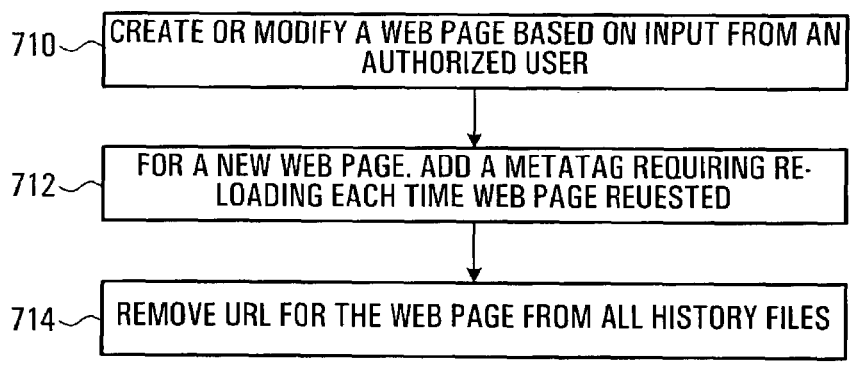

Some users have access levels 46 (FIG. 2) allowing them to create or modify web pages on the server. With reference to FIG. 7, assuming such a user logs on and creates a new web page (710), the server adds a metatag to the beginning of the web page requiring that the page be re-loaded from the server each time it is requested (712). Thus, the result is the addition of the line of code 52 of FIG. 4 to each new web page. If, instead, the user modifies an existing web page, say www.ibm.com/rio (710), the server searches the history file of each user record and removes the URL of the modified web page, whenever found (714). In consequence, after a web page is modified, the next time it is visited by any user, it no longer appears as an already visited link.

It will be appreciated from the foregoing that server 12 will maintain a history file for each authorized user of a network indicating any web pages hosted by the server that have been visited by the user, at least until such visited web pages are modified.

While the server has been described as modifying a link to stipulate the color of a visited link in a web page, equally the server could modify the link to distinguish it as a previously visited link in any other fashion. For example, the server could modify a link to stipulate a font, or to stipulate that a previously visited link flashes.

While a web page has been indicated to be identified by a URL, if a different protocol is used a web page may be identified another type of web page indicator.

Other modifications will be apparent to those skilled in the art and, therefore, the invention is defined in the claims.

What is claimed:

1. A method of operating a server, comprising:
    maintaining a plurality of history files of said web page indicators on a server, one history file for each of a plurality of users, regardless of the client devices implemented by each of the plurality of users; and
    responsive to said user requesting a given web page from said server, for each link in said given web page, comparing a web page indicator for said each link with web page indicators stored in a history file for said user;
    where a first web page indicator for said given web paste has been included in at least one of said plurality of history files and content of said given web page is updated by an authorized user, deleting said first web page indicator of said given web page from said at least one of the plurality of history files prior to said plurality of users requesting said given web page in order for said given web page to appear unvisited by any of the plurality of users; and
    responsive to a match, modifying said each link matched prior to serving up said web page.

2. The method of claim 1 further comprising:
    when said user requests said given web page, updating said one history file of said user to include a first web page indicator for said given web page.

3. The method of claim 1 further comprising:
    prior to serving Lip said given web page, adding an indicator to said given web page so that if said given web page is subsequently requested by said user at a client caching of said given web page, said given web page is re-loaded from said server.

4. The method of claim 3 wherein modifying said each link comprises modifying said each link to display in a particular color.

5. The method of claim 3 wherein modifying said each link comprises modifying said each link to display in a different font.

6. The method of claim 5 wherein said given web page is coded in hypertext markup language ("html"), each said web page indicator comprises a universal resource locator ("URL"), and modifying said each link comprises adding html code to said each link.

* * * * *